United States Patent Office 2,822,415
Patented Feb. 4, 1958

2,822,415

USE OF BIS(2-ALKYL-4-ALKOXYPHENOL) MONOSULFIDES IN RUBBER

Harry E. Albert, Akron, Ohio, and Lloyd O. Bentz, Lancaster, Pa., assignors to The Firestone Tire & Rubber Company, Akron, Ohio, a corporation of Ohio No Drawing. Application November 23, 1954
Serial No. 470,833

6 Claims. (Cl. 260—810)

This invention relates to antiozone agents which inhibit or prevent the deterioration of natural rubber. These agents are bis(2-alkyl-4-alkoxyphenol)monosulfides in which the alkyl group contains three to nine carbon atoms and the alkoxy group contains either one, two or three carbon atoms.

Oxygen and ozone both have a harmful effect on rubber, but the effect of each is different, and compounds which inhibit or prevent the harmful effect of one are not necessarily effective in stopping the harmful effect of the other.

Crabtree and Kemp in an article in Industrial and Engineering Chemistry, vol. 38, starting at page 278 (1946) explain the difference in the action of oxygen and ozone. The light-catalyzed oxidation which occurs during outdoor exposure forms a skin and crazed appearance over the exposed surface of the rubber. Ozone, even in very low concentration, attacks stretched rubber only (C. H. Leigh-Dugmore, Rubber Age and Synthetics, November and December 1952) and forms cracks perpendicular to the direction of stretch, and such cracking can occur in the absence of light.

As a matter of fact, practically all commercial rubber antioxidants are without effect in inhibiting deterioration caused by ozone. The di-substituted phenol sulfides of this invention do not absorb or act directly on the ozone, but have some unknown action in preventing the cracking which is associated with ozone exposure in stretched natural rubber.

Natural rubber is used in the manufacture of the white-sidewalls of tires. The cracking of such sidewalls has long been a problem. It is often very extensive, and because of the color of the sidewall, it is very noticeable. It is a primary object of this invention to provide antiozone agents which prevent such cracking without discoloring the sidewall. However, the antiozone agents of this invention are not limited to that use but can be employed in black sidewalls, treads, thread and other latex products, and other rubber products, either white or colored.

Tires are stressed when inflated. While a tire is at rest it is stretched statically, and on a moving vehicle it is stretched dynamically. Some of the antiozone agents are more effective in static tests and others are more effective in dynamic tests. Antiozone agents effective under both conditions will be desired for tires, but for other rubber products an antiozone agent which does not meet both tests can be used.

The antiozone agents of this invention are conveniently prepared by reacting 2 moles of the appropriate substituted phenol with 1 mole of sulfur chloride. The following example is illustrative:

2-t-BUTYL-4-METHOXYPHENOL MONOSULFIDE

Twenty-five grams (0.139 mole) of 2-t-butyl-4-methoxyphenol was dissolved in 100 ml. of n-hexane. During agitation of the solution by a motor-driven stirrer, 7.5 grams (0.72 mole) of sulfur dichloride was added over a 15-minute period at room temperature. The reaction mixture was stirred at room temperature for five hours. A small amount (10 ml.) of methanol was added to destroy any excess sulfur dichloride, and then the solution was distilled off, vacuum being applied near the end to remove the last traces. The residue was a reddish, clear, viscous, sticky liquid weighing 27.3 grams.

The bis(2-alkyl-4-alkoxyphenol)monosulfides of this invention include the butyl-, amyl-, hexyl-, heptyl-, octyl- and nonyl-4-methoxy- and -ethoxyphenol monosulfides. They include, for example:

Bis(2-isopropyl-4-methoxyphenol)monosulfide
Bis(2-t-butyl-4-methoxypheno)monosulfide
Bis(2-sec.-amyl-4-ethoxyphenol)monosulfide
Bis(2-cyclohexyl-4-methoxyphenol)monosulfide
Bis(2-n-heptyl-4-ethoxyphenol)monosulfide
Bis(2-tt-octyl-4-methoxyphenol)monosulfide
Bis(2-n-nonyl-4-ethoxyphenol)monosulfide
Bis(2-t-butyl-4-isopropoxyphenol)monosulfide The inhibiting effect of the antiozone agents in rubber was determined by treatment of unaged, cured stocks with air of controlled low ozone content in specially designed equipment and also by outdoor exposure to natural weathering. The tests were conducted with one-half inch dumbbell samples of approximately 100 gauge thickness. The special apparatus for testing with air of controlled low ozone content and the method of testing therein are described in the articles by Ford and Cooper, appearing in India Rubber World for September and October 1951, entitled "A study of the factors affecting the weathering of rubber-like materials—I and II." The following reports of such tests give the ozone concentration maintained during each test in parts per 100,000,000 parts of air, the duration of the test, and the temperature used. Two types of tests were conducted. In one type—called the dynamic test—the sample was repeatedly stretched between the limits of 0 and 20 percent elongation at the rate of 108 cycles per minute. In the other type of test—the static test—the samples were stretched at 12.5 percent elongation throughout the test. No special lights were used in either test. On completion of each test the size of the cracks in each sample was compared visually with the size of the cracks in a blank which contained no antiozone agent and which was cured and tested at the same time as the test sample. The size was determined according to an arbitrary scale of measuring, using the numerals 0, 1, 2, 3, 4 and 5 to represent no visual cracking and cracks which were very fine, fine, medium, coarse and very coarse, respectively.

The reported results include data on the tensile properties of the cured rubber stocks before and after aging 2 days in an oven at 212° F. The modulus and tensile strength are given in pounds per square inch and the elongation is reported as percent of stretch at the break. These data are included to show that the antiozone agents have no substantial deleterious effect on the cure or upon the aging of the cured stocks.

The antiozone agents were tested in white stock such as might be used in white sidewalls for tires, and also in stock such as that which might be used in tire treads. The blanks of the white stock were compounded according to the following formula:

| | Parts by weight |
|---|---|
| Natural rubber | 100 |
| White pigment and filler | 90.2 |
| Stearic acid | 1.2 |
| Sulfur | 3.0 |
| Accelerator | 0.9 |

All blanks and test samples of white stock were cured 60 minutes at 280° F.

The blanks used for testing the effect of the antiozone agents in treat stock were compounded according to the following formula:

| | Parts by weight |
|---|---|
| Natural rubber | 100 |
| Sulfur | 2.2 |
| Carbon black | 45 |
| Pine tar | 2.0 |
| Stearic acid | 2.0 |
| Accelerator | 1.0 |
| Zinc oxide | 3.0 |

All blanks and test samples of tread stock were cured 45 minutes at 280° F.

In all of the test samples, both those tested in the special apparatus and those subjected to natural outdoor weathering, 2.0 parts by weight of the antiozone agent was added to the blank formula for each 100 parts by weight of the rubber present. Any substantial small amount may be employed, and this may vary, for example, from 0.2 part by weight to 10 parts by weight, depending upon the use to be made of the rubber composition.

The following tables record the results of the illustrative tests:

Table 1.—Tread stock

| | Blank | Bis(2-t-butyl-4-methoxyphenol)monosulfide |
|---|---|---|
| | | 2 |
| Normal Tensile Properties: | | |
| 400% Modulus | 2,525 | 2,375 |
| Tensile Strength | 4,300 | 4,250 |
| Elongation at Break | 540 | 555 |
| Aged 2 Days in Oven at 212° F.: | | |
| 400% Modulus | | |
| Tensile Strength | 1,375 | 1,325 |
| Elongation at Break | 300 | 305 |
| Ozone Effects (14 Hrs. at 25 p. p. h. m. and room temperature): | | |
| Static | 3+ | 0+ |
| Dynamic | 3+ | 0 |

Table 2.—White stock

| | Blank | Bis(2-t-butyl-4-methoxyphenol)monosulfide |
|---|---|---|
| | 195.3 | 195.3 |
| Normal Tensile Properties: | | |
| 400% Modulus | 900 | 850 |
| Tensile Strength | 3,550 | 3,450 |
| Elongation at Break | 625 | 615 |
| Aged 2 Days in Oven at 212° F.: | | |
| 400% Modulus | 850 | 850 |
| Tensile Strength | 2,025 | 1,725 |
| Elongation at Break | 550 | 515 |
| Ozone Effects (7 Hrs. at 60 p. p. h. m. and 95° F.): | | |
| Static | 4+ | 1− |
| Dynamic | 4+ | 1− |

Table 3.—Evaluation of white stock after outdoor exposure

| | After 30 Days | | | After 50 Days | | |
|---|---|---|---|---|---|---|
| | Front | Back | Edge | Front | Back | Edge |
| Blank | 4+ | 1+ | 1+ | | | |
| Bis(2-t-butyl-4-methoxyphenol)monosulfide | 2+ | 1− | 2 | 3+ | 1+ | 3+ |

Table 4.—Evaluation of tread stock after outdoor exposure

| | After 30 Days | |
|---|---|---|
| | Front | Back |
| Blank | 2+ | 2− |
| Bis(2-t-butyl-4-methoxyphenol) monosulfide | 1+ | 1− |

Tables 1 and 2 show that the antiozone agents of this invention do not materially affect the cure of the rubber and also show that they prevent the formation of large cracks by action of ozone in the vulcanized unaged stocks. Outdoor aging was tested by exposing samples to the atmosphere for different periods of time and visually inspecting the size of the cracks which developed on the front and back of the various samples, and in some instances the edge, and recording the same. Table 3 records the results of exposing the white stock, and Table 4 records the result of exposing tread stock to the atmosphere. It is noted that the white stock containing 2 parts of the antiozone agent was better after 50 days than the blank after an exposure of only 30 days.

The recorded results are illustrative. The antiozone agents can be used in rubber compositions compounded for use in tires and for latex compositions compounded for use in rubber thread and in other rubber stocks.

By sulfur vulcanization is meant the curing of rubber by reaction with either free sulfur or a vulcanizing agent of the sulfur-donor type. Known agents of the latter type include the various phenol polysulfides including the alkyl derivatives thereof, the xanthogen polysulfides, the thiuram disulfides and polysulfides, various amine sulfides including dialkylamine polysulfides and reaction products of primary amines with excess sulfur. Known vulcanization accelerators are useful in speeding up the vulcanization process and are operative herein, especially the relatively active accelerators including the thiazole sulfenamides, e. g. N-cyclohexyl-2-benzothiazolesulfenamide, thiazoline sulfenamides, thiocarbamyl sulfenamides, mercaptothiazoles, mercaptothiazolines, thiazolyl mono- and di-sulfides, the N,N-dialkyl-dithiocarbamates, the thiuram sulfides, the xanthogen sulfides, metallic salts of mercaptothiazoles or mercaptothiazolines or dithiocarbamic acids. One or more accelerator activator is often used with any of the accelerators mentioned, and such activators include the various derivatives of guanidine known in the rubber art, amine salts of inorganic and organic acids, various amines themselves, alkaline salts such as sodium acetate and the like, as well as other activators known to the art. Additionally, two or more accelerators or accelerator combinations are sometimes desirable in a single rubber compound. Many of the accelerators mentioned above are suitable in latex formulations, especially such common accelerators as piperidinium pentamethylenedithiocarbamate, zinc butylxanthate, zinc ethylxanthate, zinc salt of mercaptobenzothiazole, zinc dimethyldithiocarbamate, and zinc dibutyldithiocarbamate. Although vulcanization is usually accomplished by heating a vulcanizable rubber composition at a temperature in the range of 240 to 400° F. for a time ranging from several hours to a few seconds, vulcanization does take place at lower temperatures such as ordinary room temperature. It is quite common to vulcanize a latex film containing an ultra accelerator by allowing the film to remain at room temperature several hours or a few days.

This application is a continuation-in-part of our application Serial No. 400,344, filed December 24, 1953, now abandoned.

What we claim is:

1. A sulfur-vulcanized natural rubber which includes, as an antiozone agent, a small amount of bis(2-alkyl-4-alkoxyphenol)monosulfide in which the alkyl group contains three to nine carbon atoms and the alkoxy group is from the class consisting of methoxy, ethoxy and propoxy.

2. A sulfur-vulcanized natural rubber which includes, as an antiozone agent, a small amount of a bis(2-butyl-4-methoxyphenol)monosulfide.

3. A sulfur-vulcanized natural rubber which includes, as an antiozone agent, a small amount of bis(2-t-butyl-4-methoxyphenol)monosulfide.

4. The method of vulcanizing a natural rubber composition which comprises vulcanizing with sulfur such a composition which includes, as an antiozone agent, a small amount of a bis(2-alkyl-4-alkoxyphenol)monosulfide, the alkyl group of which contains three to nine carbon atoms and the alkoxy group of which is from the class consisting of methoxy, ethoxy and propoxy.

5. The method of vulcanizing a natural rubber composition which comprises vulcanizing with sulfur such a composition which includes, as an antiozone agent, a small amount of a bis(2-butyl-4-methoxyphenol)monosulfide.

6. The method of vulcanizing a natural rubber composition which comprises vulcanizing with sulfur such a composition which includes, as an antiozone agent, a small amount of bis(2-t-butyl-4-methoxyphenol)monosulfide.

References Cited in the file of this patent

UNITED STATES PATENTS

| | | |
|---|---|---|
| 2,364,338 | Beaver | Dec. 5, 1944 |
| 2,581,930 | Albert | Jan. 8, 1952 |
| 2,670,832 | Downey et al. | Feb. 23, 1954 |
| 2,700,691 | Mayes | Jan. 25, 1955 |
| 2,726,277 | Downey | Dec. 6, 1955 |
| 2,730,436 | Young | Jan. 10, 1956 |
| 2,731,443 | Forman | Jan. 17, 1956 |